(12) United States Patent
Schemmann et al.

(10) Patent No.: US 8,737,843 B2
(45) Date of Patent: *May 27, 2014

(54) METHOD AND SYSTEM FOR A POLARIZATION MODE DISPERSION TOLERANT OPTICAL HOMODYNE DETECTION SYSTEM WITH OPTIMIZED TRANSMISSION MODULATION

(75) Inventors: Marcel F.C. Schemmann, Maria-Hoop (NL); Zoran Maricevic, Manlius, NY (US); Antonije R. Djordjevic, Belgrade (YU); Darby Racey, Cicero, NY (US)

(73) Assignee: Teradvance Communications, LLC, Fayetteville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,932

(22) Filed: Jan. 5, 2012

(65) Prior Publication Data
US 2012/0128361 A1 May 24, 2012

Related U.S. Application Data

(62) Division of application No. 12/554,241, filed on Sep. 4, 2009, now Pat. No. 8,103,173, which is a division of application No. 09/871,216, filed on May 31, 2001, now Pat. No. 7,599,627.

(51) Int. Cl.
*H04B 10/04* (2006.01)

(52) U.S. Cl.
USPC ........... 398/183; 398/188; 398/202; 398/208; 398/147; 398/81; 398/209; 398/184; 398/185; 375/271; 375/302; 375/322; 385/24; 385/27; 385/39

(58) Field of Classification Search
USPC ......... 398/183, 188, 184, 152, 202, 147, 158, 398/159, 185, 192, 193, 194, 186, 187, 189, 398/190, 191, 203, 204, 205, 206, 207, 208, 398/209, 79, 81, 210, 211, 212, 213, 214, 398/135, 136, 137, 138, 139; 375/271, 302, 375/322; 385/24, 27, 39
See application file for complete search history.

(56) References Cited

U.S. PATENT DOCUMENTS 4,044,247 A    8/1977   Brown, Jr.
4,626,803 A    12/1986   Holm
(Continued)

FOREIGN PATENT DOCUMENTS

| JP | 2000270037 A | 9/2000 |
| WO | 0156196 | 8/2001 |
| WO | 0213432 A | 2/2002 |

OTHER PUBLICATIONS

Govind P. Agrawal, "Fiber-Optic Communication Systems", Second Edition, John Wiley & Sons, Inc. 1997, Section 6.1.3 Heterodyne Detection, p. 242.     (Continued)

*Primary Examiner* — Hanh Phan
(74) *Attorney, Agent, or Firm* — Pattric J. Rawlins; Procopio, Cory, Hargreaves & Savitch LLP

(57) ABSTRACT

An optical homodyne communication system and method in which a side carrier is transmitted along with data bands in an optical data signal, and upon reception, the side carrier is boosted, shifted to the center of the data bands, and its polarization state is matched to the polarization state of the respective data bands to compensate for polarization mode dispersion during transmission. By shifting a boosted side carrier to the center of the data bands, and by simultaneously compensating for the effects of polarization mode dispersion, the provided system and method simulate the advantages of homodyne reception using a local oscillator. The deleterious effects of chromatic dispersion on the data signals within the data bands are also compensated for by applying a corrective function to the data signals which precisely counteracts the effects of chromatic dispersion.

14 Claims, 10 Drawing Sheets

(56) References Cited

U.S. PATENT DOCUMENTS

| | | | |
|---|---|---|---|
| 4,926,245 A | 5/1990 | Ueno et al. | |
| 5,001,727 A | 3/1991 | McDavid | |
| 5,101,450 A | 3/1992 | Olshansky | |
| 5,115,332 A | 5/1992 | Naito et al. | |
| 5,146,359 A | 9/1992 | Okoshi et al. | |
| 5,222,103 A | 6/1993 | Gross | |
| 5,412,351 A | 5/1995 | Nystrom et al. | |
| 5,430,568 A | 7/1995 | Little et al. | |
| 5,481,389 A | 1/1996 | Pidgeon et al. | |
| 5,638,404 A | 6/1997 | Crozier | |
| 5,748,679 A | 5/1998 | Finkenbeiner et al. | |
| 5,838,727 A | 11/1998 | Lyon et al. | |
| 5,880,870 A | 3/1999 | Sieben et al. | |
| 5,943,151 A | 8/1999 | Grasso et al. | |
| 5,949,813 A | 9/1999 | Hunsinger et al. | |
| 5,999,300 A | 12/1999 | Davies et al. | |
| 6,005,702 A | 12/1999 | Suzuki et al. | |
| 6,118,566 A | 9/2000 | Price | |
| 6,130,766 A | 10/2000 | Cao | |
| 6,137,604 A | 10/2000 | Bergano | |
| 6,141,141 A | 10/2000 | Wood | |
| 6,252,692 B1 | 6/2001 | Roberts | |
| 6,252,693 B1 * | 6/2001 | Blauvelt | 398/194 |
| 6,259,836 B1 | 7/2001 | Dodds | |
| 6,295,396 B1 | 9/2001 | Cao et al. | |
| 6,317,243 B1 | 11/2001 | Price | |
| 6,362,903 B1 | 3/2002 | Spickermann et al. | |
| 6,373,901 B1 | 4/2002 | O'Dea et al. | |
| 6,404,535 B1 | 6/2002 | Leight | |
| 6,424,444 B1 | 7/2002 | Kahn et al. | |
| 6,456,750 B1 | 9/2002 | Price et al. | |
| 6,459,519 B1 | 10/2002 | Sasai et al. | |
| 6,459,521 B1 | 10/2002 | Bakker et al. | |
| 6,462,679 B1 | 10/2002 | Van Nguyen | |
| 6,538,788 B2 | 3/2003 | Franco et al. | |
| 6,608,868 B1 | 8/2003 | Murakami et al. | |
| 6,704,375 B1 | 3/2004 | Serbe | |
| 6,728,491 B1 | 4/2004 | Ooi et al. | |
| 6,782,211 B1 | 8/2004 | Core | |
| 6,865,348 B2 | 3/2005 | Miyamoto et al. | |
| 6,990,155 B2 | 1/2006 | Adachi et al. | |
| 7,003,231 B2 * | 2/2006 | Way et al. | 398/186 |
| 7,076,169 B2 | 7/2006 | Shpantzer et al. | |
| 7,224,906 B2 | 5/2007 | Cho et al. | |
| 7,228,077 B2 | 6/2007 | Newell et al. | |
| 7,599,627 B2 * | 10/2009 | Schemmann et al. | 398/183 |
| 8,103,173 B2 | 1/2012 | Schemmann et al. | |
| 2002/0109883 A1 | 8/2002 | Schemmann et al. | |

OTHER PUBLICATIONS

Govind P. Agrawal, "Fiber-Optic Communication Systems", Second Edition, John Wiley & Sons, Inc. 1997, Section 6.5.1 Phase Noise, p. 261.
Govind P. Agrawal, "Fiber-Optic Communication Systems" Second Edition, John Wiley & Sons, Inc. 1997, Section 7.3.2 Nonlinear Crosstalk, Cross-Phase Modulation, p. 326.
Govind P. Agrawal, "Fiber-Optic Communication Systems", Second Edition, John Wiley & Sons, Inc. 1997, Section 6.1.2 Homodyne Detection, p. 241.
Govind P. Agrawal, "Nonlinear Fiber Optics", Second Edition, Academic Press, 1989, Section 9.4.1 Frequency-Selective Brillouin Amplification, pp. 394-396.
Steve Yao, "Combat Polarization Impairments with Dynamic Polarization Controllers", General Photonics Corp. 2000, www.generalphotonics.com.
Agilent AN, 1335, "HPSK Spreading for 3G", (2000).
Ariyavisitakul, Sirikiat et al., "A Power Efficient Linear Digital Modulator and Its Application to an Anti-Multipath Modulation PSK-RZ Scheme," Department of Electronics, Kyoto University, Kyoto 606, Japan, IEEE 1987.
D. Breuer and K. Petermann, Comparison of NRZ-and RZ-Modulation Format for 40-Gb/s TDM Standard-Fiber Systems, IEEE Photonics Technology Letters, vol. 9, No. 3, Mar. 1997.
D. D. Falconer, Jointly Adaptive Equalization and Carrier Recovery in Two-Dimensional Digital Communication System, The Bell System Technical Journal (Mar. 1976).
Ennser, K et al., "Performance of RZ-Versus NRZ-Transmission on Standard Single-Mode Fibers," IEEE Photonics Technology Letters, vol. 8, No. 3, Mar. 1996.
F. Derr, Optical QPSK Homodyne Transmission of 280 Mbit/s, Electronics Letters (Mar. 1990).
Forghieri, Fabrizio et al., "RZ Versus NRZ in Nonlinear WDC Systems," IEEE Photonics Technology Letters, vol. 9, No. 7, Jul. 1997.
Hayee, M.I. et al., "NRZ Versus RZ in 10-40-Gb/s Dispersion-Managed WDM Transmission Systems," IEEE Photonics Technology Letters, vol. 11, No. 8, Aug. 1999.
Hermann Bischl, Chromatic and Polarization Dispersion Limitations in Coherent Optical BPSK and QPSK Systems, J. Opt. Commun. (1991).
Hongxing Dai, Shlomo Ovadia, Senior Member, IEEE, and Chinlon Lin, Fellow, IEEE, Hybrid AM-VSB/M-QAM Multichannel Video Transmission over 120 km of Standard Single-Mode Fiber with Cascaded Erbium-Doped Fiber Amplifiers, IEEE Photonics Technology Letters, vol. 8, No. 12, Dec. 1996.
HP Application Note 1298, (entitled "Digital Modulation in Communications Systems—An Introduction"), 1997.
Jack H. Winters, Equalization in Coherent Lightwave Systems Using a Fractionally Spaced Equalizer, Journal of Lightwave Technology (Oct. 1990).
Katsushi Iwashita, Chromatic Dispersion Compensation in Coherent Optical Communications, Journal of Lightwave Tech. (Mar. 1990).
Kazushige Yonenaga, A Fiber Chromatic Dispersion Compensation Technique with an Optical SSB Transmission in Optical Homodyne Detection Systems, IEEE Photonics Technology Letters (Aug. 1993).
L. Boivin, M. C. Nuss, Member, IEEE, J. Shah, D. A. B. Miller, Member, IEEE, and H. A. Haus, Life Fellow, IEEE, "Receiver Sensitivity Improvement by Impulsive Coding," IEEE Photonics Technology Letters, vol. 9, No. 5, May 1997.
M. Chatterjee & L. Green, Derivation of Impulse Response and Transfer Function of an Optical Fiber Under Chromatic Dispersion and Application to a Linear Fiber-optic Communication System, IEEE 1990.
Miyano et al., "Suppression of degradation induced by SPM/XPM+GVD in WDM transmission using a bit-synchronous intensity modulated DPSK signal," Fifth Optoelectronics and Communications Conference (OECC 2000) Technical Digest, Jul. 2000, Makuhari Messe.
Peter J. Winzer and Andreas Kalmar Sensitivity Enhancement of Optical Receivers by Impulsive Coding Journal of Lightwave Technology, vol. 17, No. 2, Feb. 1999.
R.G. Priest, Dispersion Compensation in Coherent Fiber-Optic Communications, Optics Letters (Aug. 1987).
R.M. Jopson, A.H. Gnauck, L.E. Nelson, L.D. Garrett, C. Wolf, Evaluation of return-to-zero modulation for wavelength division-multiplexed transmission over conventional single-mode fiber, Crawford Hill Laboratory, Box 400, Holmdel, New Jersey 07733, OFC '98 Technical Digest, 1998.
Robert T.B. James and Keigo Iizuka, "Polarization Insensitive Homodyne Detection with All Optical Processing Based on the Photorefractive Effect," Journal of Lightwave Technology, vol. 11, No. 4, Apr. 1993.
Royset, et al., ""Compensation of Optical Fibre Dispersion in the Electrical Domain for Transmission Systems With Direct Detection,"" Electronics Letters, Jan. 1994.
Seiji Norimatsu, An 8 Gb/s QPSK Optical Homodyne Detection Experiment Using External-Cavity Laser Diodes, IEEE (1992).
Shahid Qureshi, Adaptive Equalization, Proceedings of the IEEE (Sep. 1985).
Shahid Qureshi, Adaptive Equalization: High Speed Data Transmission Over Voice Band Telephone Lines, IEEE Communications Magazine (Mar. 1982).
Shigeki Aisawa, Noboru Takachio, and Katsushi Iwashita, A 10 Gb/s 8 channel transmission experiment over 480 km with 120 km repeater spacing using frequency modulated RZ pulse format, 22nd European Conference on Optical Communication-ECOC'96, Oslo 2, 1996.

(56) References Cited

OTHER PUBLICATIONS

Silvello Betti, A Novel Multilevel Coherent Optical System: 4-Quadrature Signaling, Journal ofLightwave Technology (Apr. 1991).

Silvello Betti, Homodyne Optical Coherent Systems Based on Polarization Modulation, Journal ofLightwave Technology (Oct. 1991).

Silvello Betti, Phase Noise and Polarization State Insensitive Optical Coherent Systems, Journal of Lightwave Technology (May 1990).

Takanori Okoshi, Double-Stage Phase-Diversity (DSPD) Experiment Using 100 Mbit/s FSK Coherent Optical Communication System, Electronics Letter (Oct. 1989).

Takanori Okoshi, Double-Stage Phase-Diversity (DSPD) Optical Receiver: A New Scheme Having the Advantages of Heterodyning and Homodyning, OFC '89, Houston, TX, 6th-9th, Postdeadline paper PD-19(Feb. 1989).

Takanori Okoshi, Double-Stage Phase-Diversity Optical Receiver: Analysis and Experimental Confirmation of the Principal, Journal of Lightwave Technology (Mar. 1990).

Walid A. Atia and Roy S. Bondurant, "Demonstration of Return-to-zero Signaling in Both OOK and DPSK Formats to Improve Receiver Sensitivity in an Optically Preamplified Receiver," 0-7803-5634-9/99, 1999.

Shpantzer et al. "System and Method for Using Polarized Light in Telecommunications." U.S. Appl. No. 60/234,930, filed Sep. 26, 2000.

\* cited by examiner

PMD corrected

SC'S 0° SHIFTED

SC'S 90° SHIFTED

METHOD AND SYSTEM FOR A POLARIZATION MODE DISPERSION TOLERANT OPTICAL HOMODYNE DETECTION SYSTEM WITH OPTIMIZED TRANSMISSION MODULATION

CROSS-REFERENCES TO RELATED APPLICATIONS

This application is a divisional of U.S. patent application Ser. No. 12/554,241 filed Sep. 4, 2009, which is divisional of U.S. patent application Ser. No. 09/871,216 filed on May 31, 2001, which is related to copending and commonly assigned U.S. patent application Ser. No. 09/748,750 , filed in the United States Patent and Trademark office on Dec. 26, 2000, entitled "Method, System and Apparatus for Optically Transferring Information", which is expressly incorporated herein in its entirety by reference thereto.

FIELD OF THE INVENTION

The present invention relates to optical data communication, and in particular, relates to a method and optical data communication system that improves signal-to-noise ratio of optical data signals, counteracts polarization mode dispersion and improves robustness to fiber nonlinearities.

BACKGROUND INFORMATION

Currently, optical data communication systems are being upgraded from a 10 Gb/s data transmission rate up to a 40 Gb/s transmission rate. However, data transmission at 40 Gb/s (or higher) presents extensive design challenges because the effects of polarization mode dispersion (PMD), chromatic dispersion and fiber non-linear effects such as cross-phase modulation become more dominant at the higher transmission rates. In particular, the limit of tolerable polarization mode dispersion, usually defined as 14% of the data bit duration, is only 3.5 ps at a 40 Gb/s transmission rate. A 3.5 ps polarization mode dispersion translates to an attainable reach of several hundred kilometers over single mode fiber which has a typical fiber PMD of 0.1 ps/km$^{1/2}$.

Current optical communications systems, such as the PMD compensation arrangement described in U.S. Pat. No. 6,130,766 to Cao, generally attempt to compensate for PMD by splitting received optical signals into x and y mode components having orthogonal polarization, and then adjusting the delay on one of the orthogonal components to align the modes. This arrangement requires significant signal processing and differential delays to cover the range of frequencies carrying data.

Nonlinearities induced during optical transmission are also amplified at higher data rates. While it is necessary for accurate detection that optical data signals be at least 20dB above background noise, if the data signals are transmitted with too much power, nonlinearities can play a greater role in distorting the signal. In addition, in coherent systems typical heterodyne optical reception systems suffer an inherent 3dB penalty with respect to homodyne systems and introduce phase noise through use of a local oscillator, and thereby add a further level of complexity and constraints to optical system design.

What is therefore needed is a cost-effective method and system that compensates for PMD, optimizes SNR performance and minimizes phase noise and nonlinearities associated with transmission over fiber at high data transmission rates.

SUMMARY OF THE INVENTION

The present invention meets the above objectives by providing an optical homodyne communication system and method in which a reduced amplitude side carrier is transmitted along with data bands in an optical data signal, and upon reception, the side carrier is boosted, shifted to the center of the data bands, and its polarization state is matched to the polarization state of the respective data bands to compensate for polarization mode dispersion during transmission. This scheme achieves the signal-to-noise benefits of homodyne reception without incurring the conventional restrictions and complications of homodyne reception such as requiring the phase of a signal from a local oscillator to be locked to the phase of the optical signal.

According to one embodiment, the present invention provides a method of optical communication that begins with providing a quadrature modulated optical data including two data bands separated in frequency, each data band having in-phase and quadrature components. The power of the quadrature modulated optical data signal is limited in order to limit non-linear effects by reducing the power of the optical data signal during transitional states in which data symbols transmitted in the optical data signal change in value, and in particular by reducing the power to zero such that transmitted power decreases to zero at approximately the mid point of the transitional states. The optical data signal is combined with a side carrier at a single frequency between the two data bands of the optical data signal and then transmitted across optical fiber to a receiver.

At the receiver, the side carrier is separated from the two data bands of the combined optical data signal and increased in amplitude relative to the data. The side carriers are then shifted to the middle of each of the respective two data bands. Since the relationship between the polarization state of the side carriers and the polarization state of the data bands does not stay constant during transmission over optical fiber, the polarization state of the shifted side carriers is adjusted to match the polarization state of the data bands at which they are centered.

The present invention further provides a method of compensating for the effects of chromatic dispersion during transmission over optical fiber by separating the in-phase and quadrature components of the two data bands prior to optoelectric conversion, and, after optoelectric conversion, compensating for chromatic dispersion by applying a corrective function to each of the in-phase and quadrature components of the data bands, the corrective function precisely counteracting the effects of chromatic dispersion on the in-phase and quadrature components.

The present invention also provides a method of providing information concerning a transmission device by providing an optical data signal having data bands and a side carrier with the side carrier modulated to carry an identification code, the identification code including information concerning the transmitter. According to an embodiment of the present invention, the information concerning a transmitter embedded in the side carrier includes parameters used in the corrective function to precisely counteract the effects of chromatic dispersion.

An optical data signal transmitter is provided for generating the quadrature modulated optical data signal including at least one side carrier. The transmitter includes a Mach-Zender modulator which generates an optical carrier signal by modulating a pair of side carriers onto an input optical signal. The optical carrier signal is modulated by at least two phase modulators which modulate a pair of data signals, in quadrature, onto the optical carrier signal, outputting an optical data signal including at least two data bands. By spreading the data bands onto the pair of side carriers, the amplitude of the optical data signal is reduced to zero during transitions between data symbols. The transmitter also includes a second Mach-Zender modulator which imprints a low-frequency TX ID (transmitter identification code) side carrier onto the input optical signal. The TX ID signal side carrier then combined with the optical data signal for transmission. The transmitted identification code includes information concerning the transmitter, such as its location, from which the distance between the transmitter and a receiver may be deduced.

The present invention further provides a receiver for implementing homodyne reception. The receiver includes a side carrier boosting module for increasing the amplitude of the side carrier relative to the data bands in the optical data signal. The receiver further includes a side carrier shifting module coupled to the side carrier boosting module which shifts the side carrier into two shifted carriers. Each of the shifted carriers is shifted to the center of one of the data bands. In addition, means for compensating polarization mode dispersion that are coupled to the side carrier shifting module match the polarization states of the shifted carriers to the data bands by adjusting either the polarization state of the shifted carriers or the polarization state of the data bands. After optoelectric conversion of the optical data signal, the receiver employs a chromatic dispersion correction stage that includes circuits that apply transfer functions to the in-phase and quadrature detected data channels

DETAILED DESCRIPTION

I. Transmission

In accordance with the present invention, at a transmitter, a pair of side carriers is modulated onto each side of a monochromatic optical carrier signal, which is then split into two channels. Each optical carrier signal channel is modulated with two 10 Gb/s data signals in an orthogonal phase relationship to one another. The data signals are spread onto the two side carriers in each channel, and in effect, are spread out by fifty percent in the frequency domain. This spreading is equivalent to multiplication by a sine wave at half the data rate, and results in each data symbol returning to zero between transitions, referred to as quadrature-return-to-zero (QRZ). Using QRZ, the power of the optical data signal is made independent of the data pattern. The polarization of one of the optical data signal channels is then shifted, and one of the channels is combined with a channel of the original monochromatic carrier that has been modulated with a transmission idenfitication carrier of less than 100 kHz.

The two optical data signal bands, which each carry a 20 Gb/s data stream, are combined and either multiplexed with adjacent channels at similar frequency and orthogonal polarization or one of the two channels is shifted in polarization to match the other channel. In either case, the optical data signals are multiplexed according to a Dense Wave Division Mulitplexing (DWDM) scheme and transmitted along long haul fiber to a destination receiver.

Figure 1:
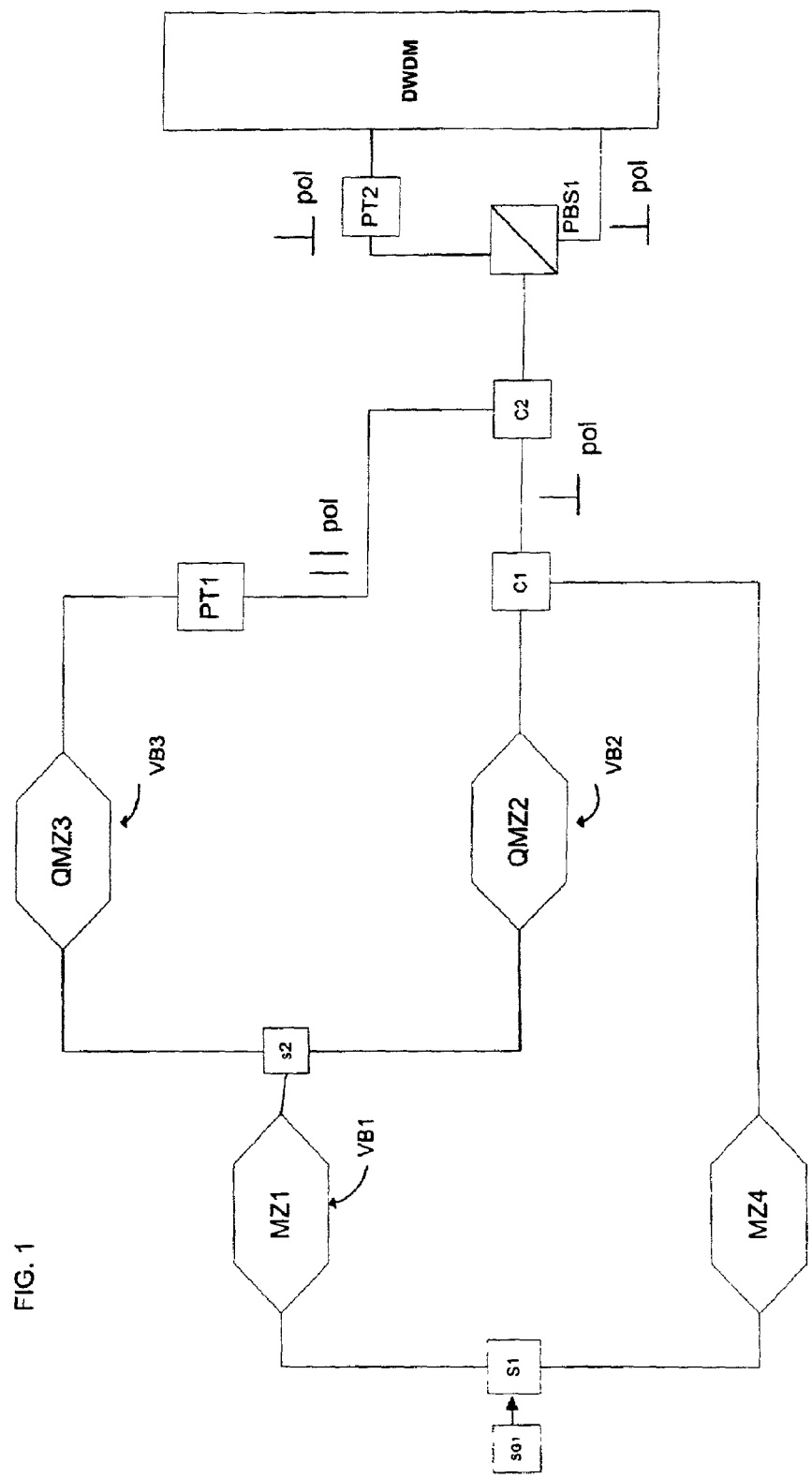
FIG. 1 is a block diagram of a transmitter according to an embodiment of the present invention.
Figure 2A:
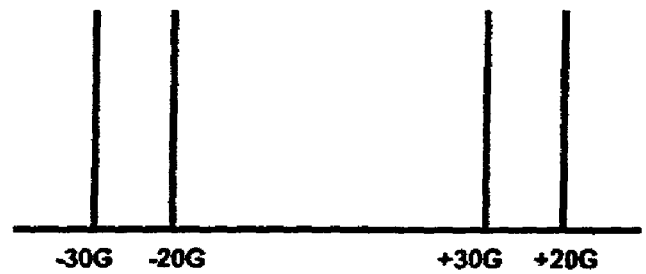
FIG. 2*a* shows the spectrum of an optical carrier signal at the output of MZ1 of FIG. 1 according to an embodiment of the present invention.

FIG. 1 illustrates an embodiment of a transmitter according to the present invention, which may be implemented on a Lithium-Niobate chip, for example. An optical signal generator SG1, which may be a laser, generates a monochromatic, polarized optical carrier at a reference frequency which for purposes of the following discussion is designated as the origin (0 GHz) in terms of relative frequency. The optical signal is thereafter split into two channels, an upper channel going to Mach-Zender modulator MZ1 and a lower channel being transmitted to Mach-Zender modulator MZ4. The division of light intensity between the two channels can be uneven with the lower channel receiving, for example, just 10 percent of the light intensity generated by SG1. At narrow-band modulator MZ4, the lower channel of the optical signal is modulated with a "Transmitter Identification" (TX ID) tone in the frequency range of 10 KHz to 100 KHz above the reference frequency. At modulator MZ1, two sets of side carriers at +/−20 GHz and +/−30 GHz are modulated onto the optical signal. The spectrum for the modulated signal, denoted an optical carrier signal, is shown in FIG. 2a. As shown in the figure, the resulting spectrum output from MZ1 shows four peaks, two below the reference frequency at −30 GHz and −20 GHz relative to the reference frequency, and two above the reference frequency at +20 GHz and +30 GHz.

Figure 2B:
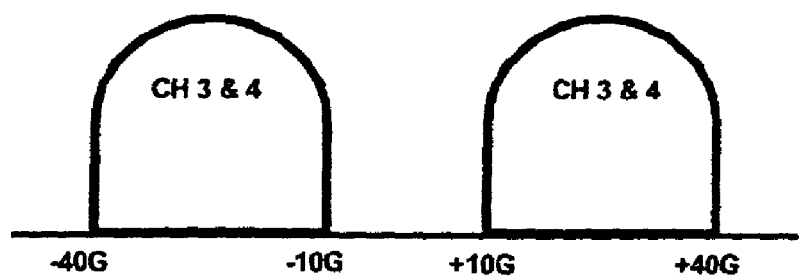
FIG. 2*b* shows the spectrum of an optical data signal at the output of QMZ3 of FIG. 1 after data modulation in quadrature according to an embodiment of the present invention.
Figure 2C:
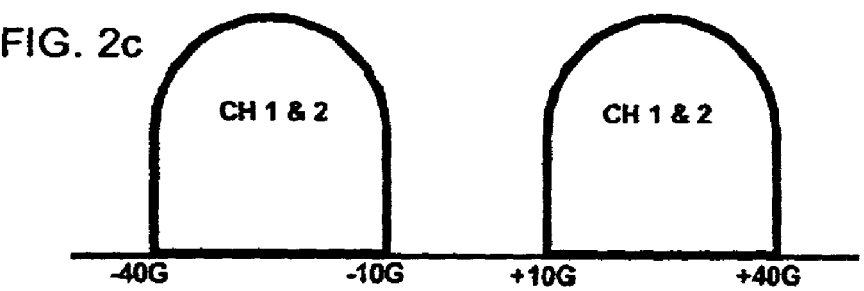
FIG. 2*c* shows the spectrum of an optical data signal at the output of QMZ2 of FIG. 1 according to an embodiment of the present invention.

The output of modulator MZ1 is further split into an upper channel which is transmitted to quadrature data modulator QMZ3 and a lower channel which is transmitted to quadrature data modulator QMZ2. Data modulator QMZ2 imprints two individual 10 Gb/s data streams in quadrature (in orthogonal phase relationship) CH.1 and CH.2 onto each of the pairs of side carriers above and below the reference frequency. Similarly, data modulator QMZ3 imprints individual 10 Gb/s data streams CH.3 and CH.4 onto each of the pairs of side carriers in the optical carrier signal. Respective bias control electrodes VB2 and VB3 assist in keeping the data streams in quadrature. Spectra of the outputs from QMZ3 and QMZ2 are shown in FIG. 2b and FIG. 2c respectively. As can be discerned in FIG. 2b and FIG. 2c, the output spectra from QMZ3 and QMZ2 show two data bands, one extending from −40 GHz to −10 GHz and another extending from +10 GHz to +40 GHz relative to the reference frequency.

By imprinting two 10 Gb/s data streams in quadrature, in effect, 20 Gb/s of data are modulated onto each pair of side carriers (−30, −20 GHz and +20, +30 GHz, respectively) and each 20 Gb/s data band covers 30 GHz in the frequency domain. By providing two side carriers, with one side carrier in the pair a clock rate away from the other (i.e., 30 GHz being a clock away from 20 GHz), the data bits in both I and Q format are multiplied in the time domain by a 5 GHz sinusoid which crosses zero every 100 ps. Thus, the total data signal always crosses through zero in between any pair of symbols (any pair of I,Q data), referred to as quadrature-return-to-zero (QRZ) modulation.

Figure 3:
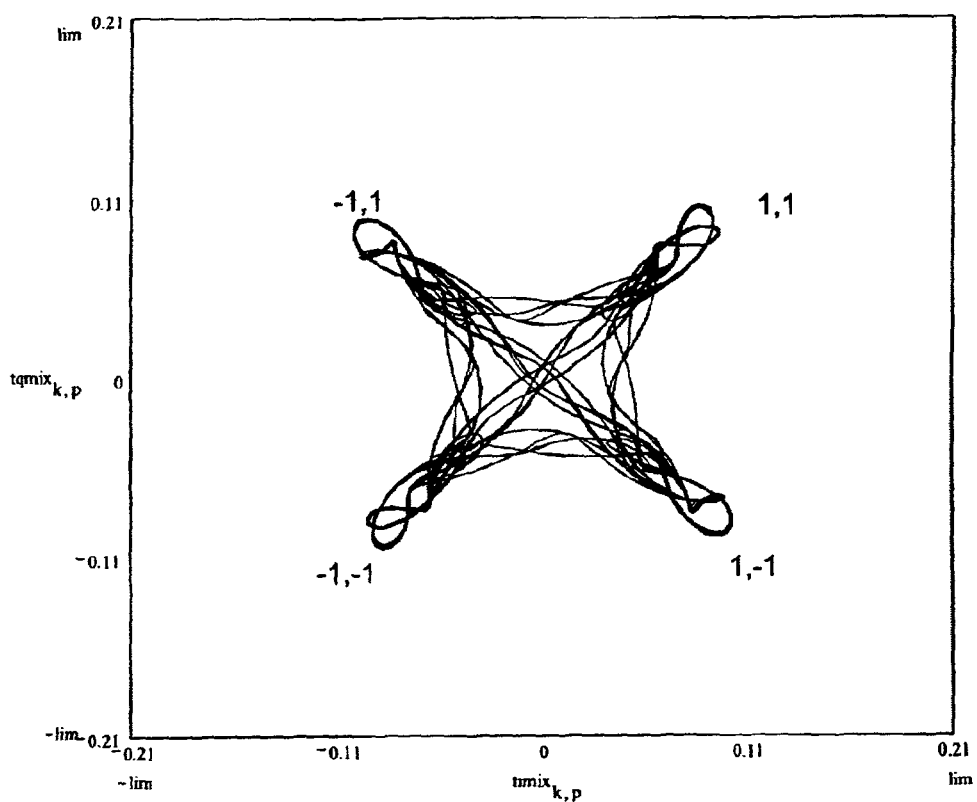
FIG. 3 shows a 10G symbol per second Quadrature Return to Zero (QRZ) constellation diagram of the output from QMZ2 and QMZ3.

FIG. 3 illustrates the key property of the QRZ format, showing that the trajectory between two successive symbols always leads through the I-Q origin. Each corner of the figure represents a pair of I, Q data symbols (e.g., I=1,Q=−1 or I=−1, Q=1). As shown, to get from adjacent corner points I=1, Q=1 (upper right corner) to I=1, Q=−1 (lower right corner) the optical data signal must travel through the origin (0,0). During each trajectory through the origin, the power of the signal, which is proportion to the square of its amplitude, goes to zero.

Figure 4A:
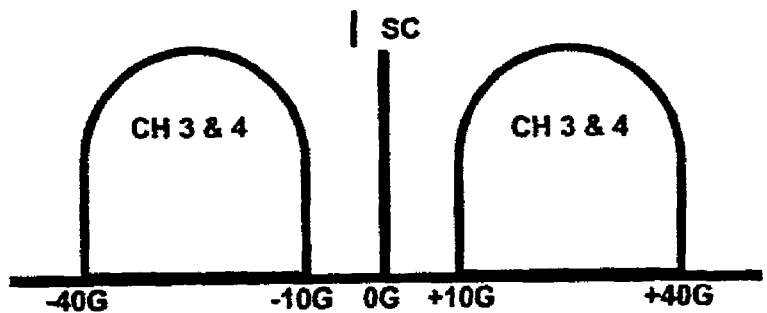
FIG. 4*a* shows the spectrum of an optical data signal at the output of C1 of FIG. 1 according to an embodiment of the present invention.
Figure 4B:
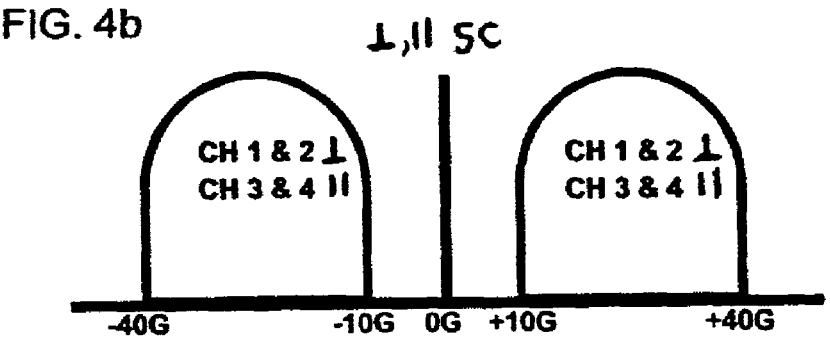
FIG. 4*b* shows the spectrum of an optical data signal at the output of C2 of FIG. 1 according to an embodiment of the present invention.

Returning to FIG. 1, the output from modulator QMZ3 is input to a polarization transformer PT1, which shifts the polarization of the optical data signal output from QMZ3 90 degrees. The polarization of the signal output from PT1 is arbitrarily illustrated by parallel lines as parallel polarization as opposed to a perpendicular polarization of the original optical signal. Furthermore, the output optical data signal from modulator QMZ2 is combined at combiner C1 with the TX ID pilot signal from MZ4. The output from C1 is shown in FIG. 4a. As noted above, the intensity of the TX ID signal is reduced in comparison with the optical data signal from QMZ2. It is also noted that the polarization of the output signal from C1 is shown as perpendicular, since the polarization of the output from C1 remains unchanged from the original polarization. Thereafter, the output signal from PT1 is combined with the output signal from combiner C1 at C2. The spectrum of the output signal out of C2 is shown in FIG. 4b. As can be discerned, the spectrum includes data channels 1, 2, 3 and 4 in both lower and upper data bands. Channels 1 and 2 are in perpendicular polarization and channels 3 and 4 are in parallel polarization. The reference carrier at approximately 0 GHz from MZ4 is in perpendicular polarization.

Figure 4C:
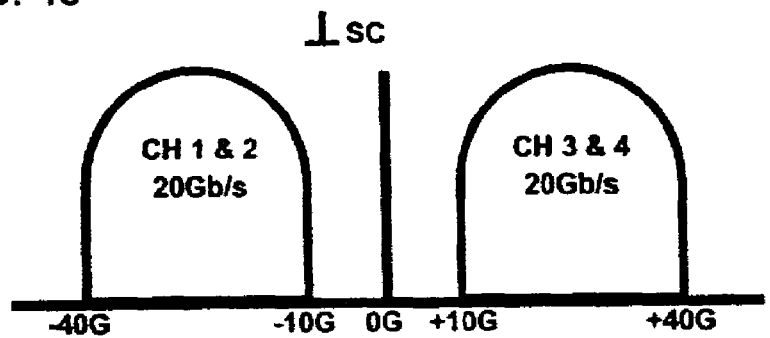
FIG. 4*c* shows the spectrum of an optical data signal at the output of the DWDM of FIG. 1 according to an embodiment of the present invention.

According to the illustrated embodiment, the output signal from C2 is input to a polarization beam splitter PBS1 which splits the signal into perpendicular and parallel polarized components, thereby separating the data channels 1 and 2 from channels 3 and 4. The perpendicular component (containing data channels 1 and 2 as well as the central reference frequency) is transmitted along lower path 102 to a first channel of a dense wave division multiplexer DWDM, the parallel component (containing data channels 3 and 4) is input to a polarization transformer PT2, which rotates the polarization of the parallel component back into a perpendicular state. The output from PT2 is then input to a second DWDM channel. Each DWDM channel acts as a band pass filter and passes only frequencies that fall within a 50 GHz band. Assuming for illustrative purposes that DWDM channel 1 passes frequencies from −50 GHz to 0 GHz relative to the reference frequency, and DWDM channel 2 passes frequencies from 0 to +50 GHz, data channels 1 and 2 are passed only in the data band from −40 GHz to −10 GHz and while data channels 3 and 4 are passed only in the data band from +10 GHz to +40 GHz. The DWDM multiplexes each of the passed bands onto a long haul fiber (not shown). The output spectrum from −50 GHz to +50 GHz output from the DWDM is shown in FIG. 4c. The adjacent DWDM channels each pass 20 Gb/s of data, combining for a total of 40 Gb/s.

In an alternative embodiment, a polarization multiplexing scheme may be used, making it unnecessary to separate data channels 1 and 2 from data channels 3 and 4. As described in related and commonly owned application [Ser. No. 09/782, 354] hereby incorporated for reference, the pairs of data channels can occupy the same data band if their polarization states remain orthogonal and thus do not interfere with each other. In this implementation, the polarization beam splitter PBS1 is not needed and the output from C2 can be sent directly to one of the DWDM input channels.

II. Reception

In accordance with the present invention, a homodyne reception system is employed to receive the optical data signal generated as described above. Upon reception, the transmitted side carrier at the reference frequency is boosted to increase the signal-to-noise ratio (SNR) of the optical data signal and to compensate for the attenuation of the side carrier in the transmitter. The boosting of the side carrier increases the SNR because of the implementation of homodyne reception in which overall detected signal power is increased in proportion to the power of the local oscillator, or in the present case (as will be discussed below), the transmitted side carrier.

Once the amplitude of the side carrier power is boosted relative to the transmitted data bands, the side carrier is shifted by +/−25 GHz into two side carriers that are each shifted to the center of one of the two data bands to further implement homodyne reception.

After the shifting of the side carriers, the two side carriers are separated and then modified by polarization controllers which match the time-varying polarization state of each the side carriers to the different time-varying polarization state of the respective data bands, thus overcoming the effects of polarization mode dispersion by controlling the polarization at only a single frequency.

According to an embodiment of the present invention, a chromatic dispersion compensation stage is used to counter the effects of dispersion during transmission over long haul fiber. Since the effects of dispersion can be modeled as a transfer function that is applied to the I and Q data signals, the chromatic dispersion compensation stage applies a compensating correction function that effectively counteracts the transfer function, rendering the I and Q data signals into their original non-dispersed state.

Figure 5:
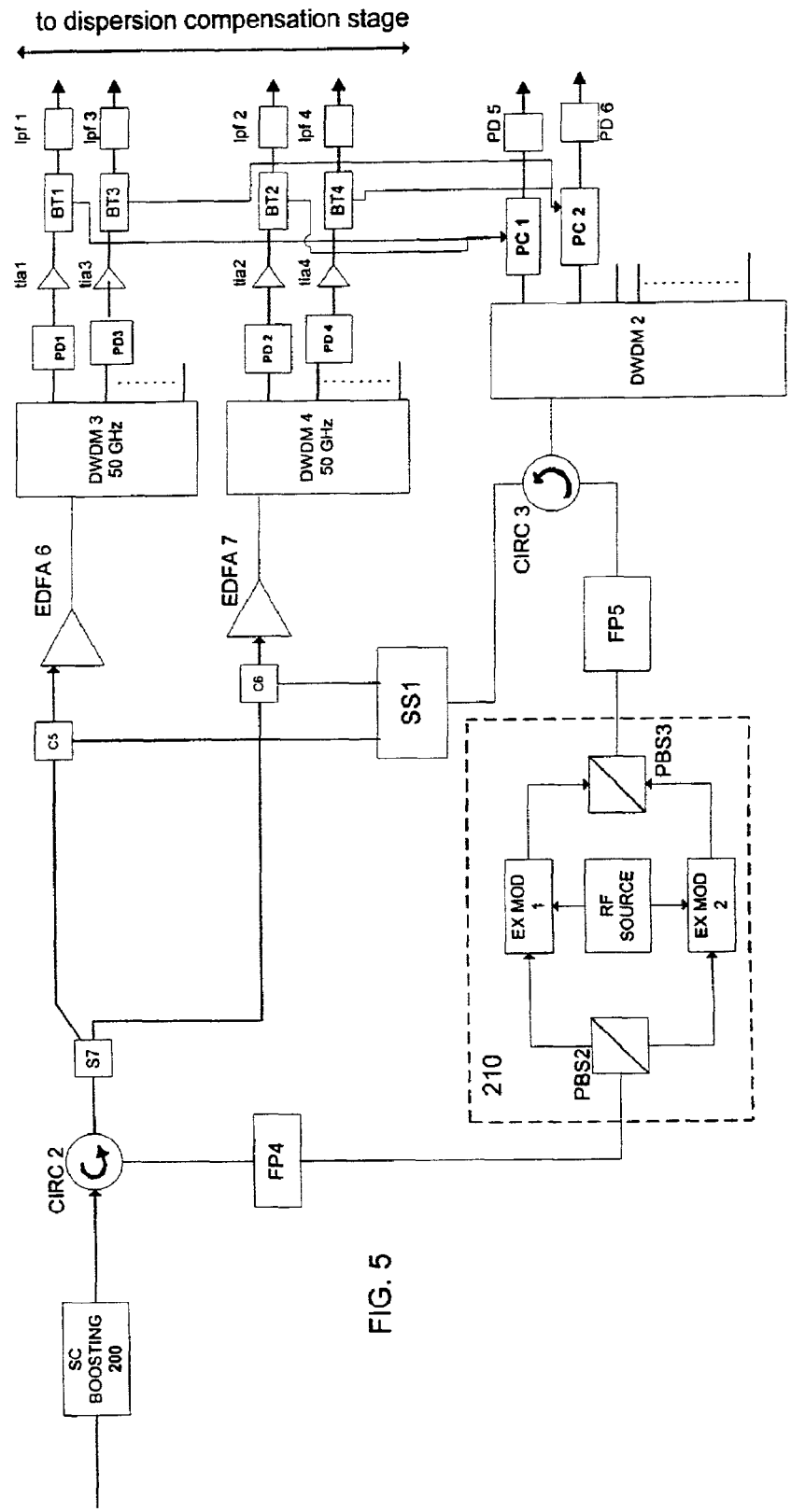
FIG. 5 is a block diagram of a receiver according to an embodiment of the present invention.
Figure 6:
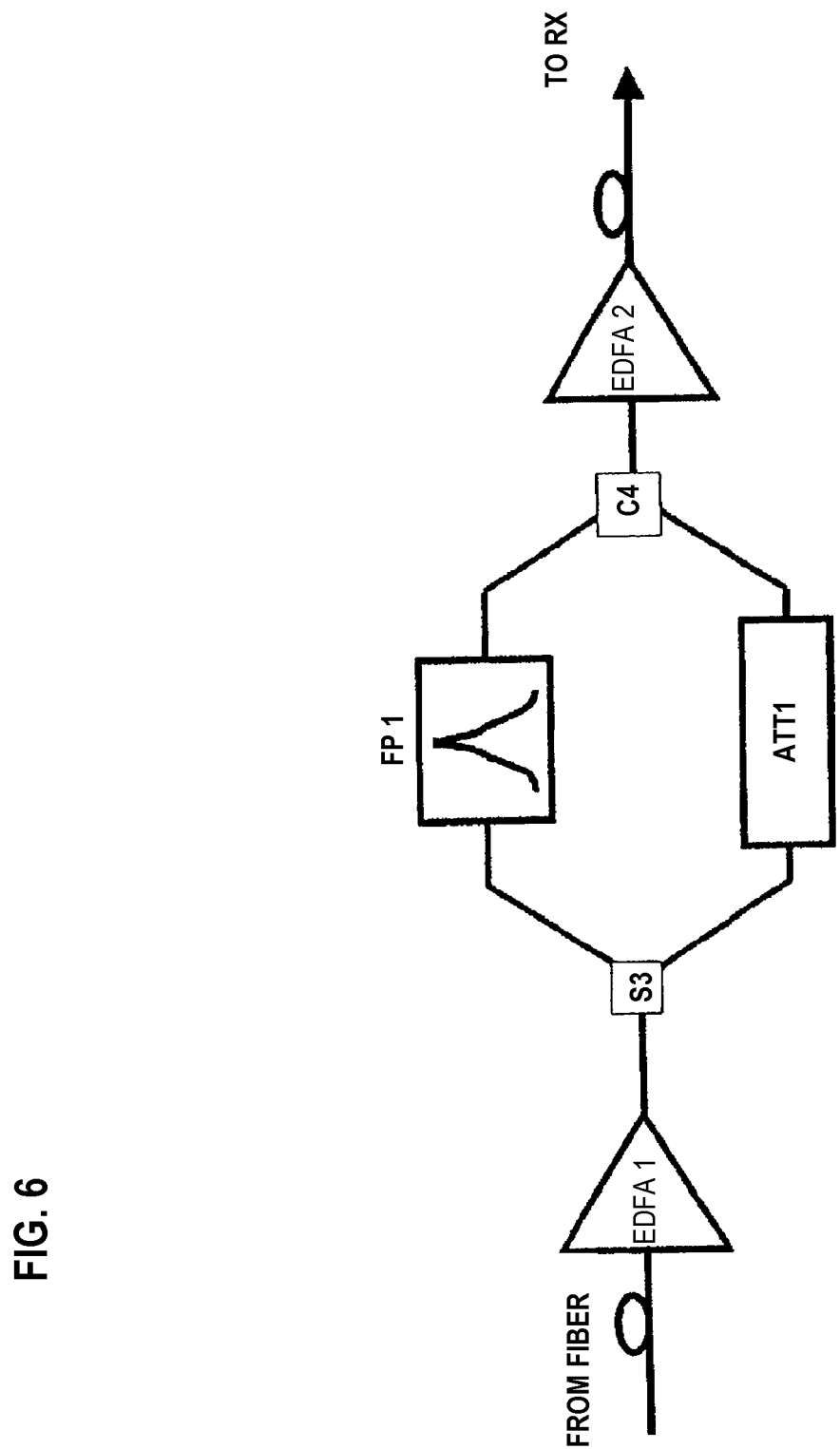
FIG. 6 is a block diagram of a first embodiment of the side carrier boosting module according to the present invention.

FIG. 5 illustrates an embodiment of a homodyne receiver according to the present invention. An optical data signal is received first by a side carrier boosting module 200 for which the present invention provides two exemplary embodiments. In a first embodiment of the side carrier boosting module, shown in FIG. 6, the optical data signal is first input to an optical amplifier EDFA1, which may be, for example, an erbium-doped fiber amplifier (EDFA). It is noted that all further optical amplifiers used in the implementations described below may be implemented as erbium-doped fiber amplifiers. The optical amplifier EDFA1 amplifies the entire spectrum of the received signal by, for example, approximately 15-18 dB. The amplified signal output from EDFA1 is split at S3 between an upper branch that is coupled to a Fabry-Perot resonator FP1 and a lower branch that is coupled to an attenuator ATT1.

The Fabry Perot resonator FP1 functions as a high-Q filter that nearly completely filters out all frequencies excepts for a series of frequencies that are separated by, for example, 100 Ghz which, according to the International Telecommunication Union (ITU) grid, is the amount of bandwidth allocated for each channel. The resonator FP1 is adjusted to pass the side carrier at the reference frequency and filter out the data bands of the optical data signal. It is noted in this regard that it is contemplated that the embodiments of the present invention be used in the context of the ITU grid, and that the reception approach described allows for simultaneous processing of side carriers for a plurality of ITU grid-spaced channels. The lower branch passed to ATT1, which contains both the data bands and the side carrier is attenuated. The signals output from FP1 and ATT1 are combined in combiner C4 and then passed to a further optical amplifier EDFA2 where the combined signal is again amplified by, for example, approximately 15-18 dB. Because the side carrier was isolated and boosted in FP1 and the data bands were attenuated in ATT1, the combined signal contains a side carrier boosted at least 10 dB in amplitude relative to the data bands.

Figure 7:
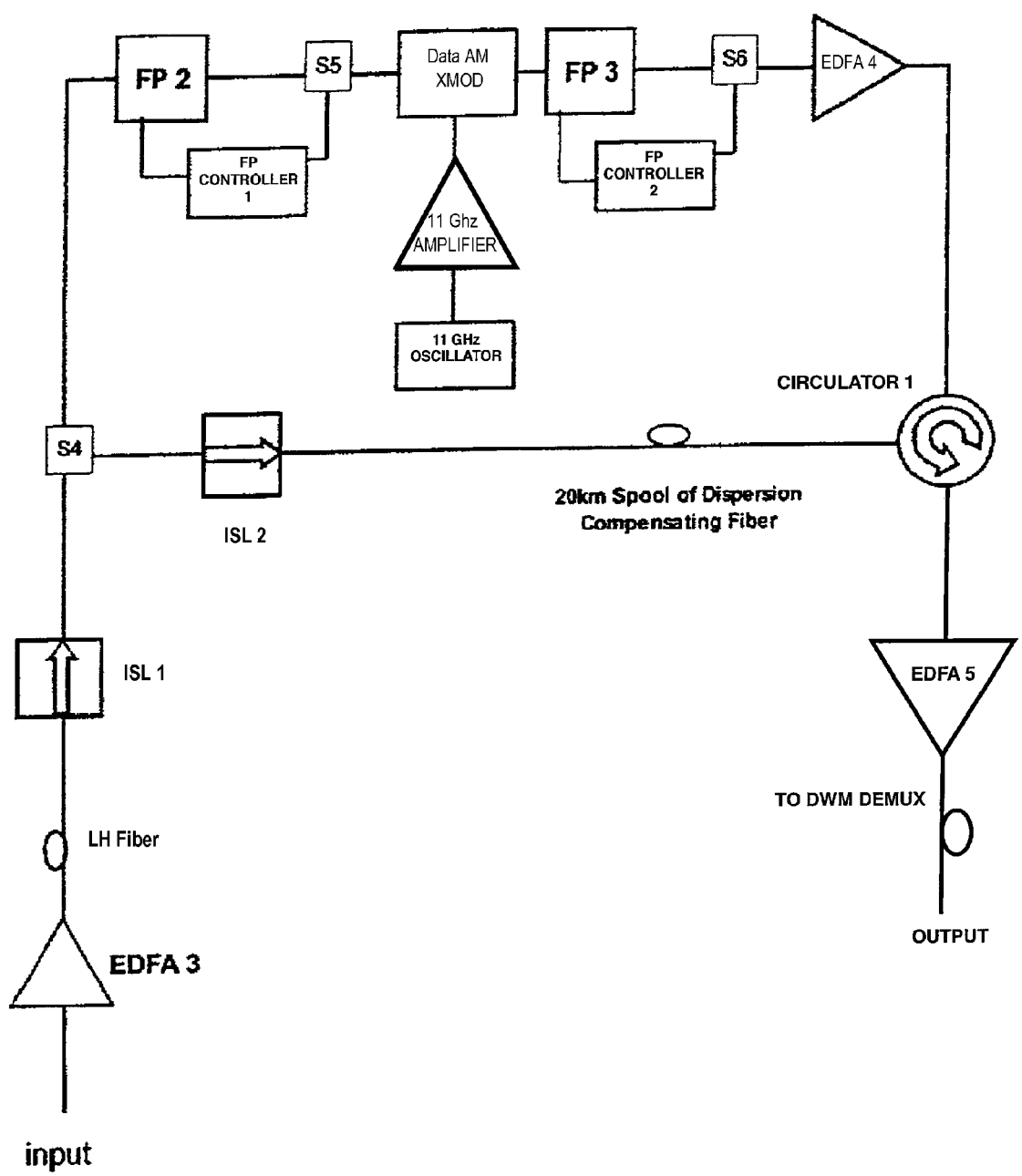
FIG. 7 is a block diagram of a second embodiment of the side carrier boosting module according to the present invention which employs the Stimulated Brillouin Scattering (SBS) effect.

A second embodiment of the side carrier boosting module, which advantageously makes use of the amplitude-enhancing effect of Stimulated Brillouin Scattering (SBS), is shown in FIG. 7. The SBS effect causes a first optical signal having narrow frequency band around frequency X to be amplified when collides with a signal of frequency X+≈11 GHz traveling in the opposite direction. Referring to FIG. 7, the received signal is input to optical amplifier EDFA3 which amplifies the entire spectrum of the input signal. The signal output from amplifier EDFA3 is transmitted to optical isolator ISL1, which permits optical signal to travel only in one direction (the direction indicated by the arrow in the figure) and prevents optical signals being reflected or transmitted back toward the amplifier EDFA3. From the optical isolator ISL1, the optical data signal is split into two branches at splitter S4.

A first upper branch from splitter S4 leads to Fabry Perot resonator FP2, which passes the side carrier (and other modes in the series of frequencies) in between the data bands. FP controller 1 automatically adjusts the resonator FP2 so that it correctly passes the side carrier using input from splitter S5 and filters out the data bands. The output from FP2 is delivered to external modulator XMOD 1, which also receives an 11 GHz signal from a 11 GHz oscillator through an 11 GHz amplifier. The external modulator XMOD 1 modulates the 11 GHz signal onto the side carrier. The spectrum of the output from the modulator XMOD 1 thereafter contains the reference frequency and two side frequencies located 11 GHz both above and below the reference frequency. This output signal is then transmitted to another resonator FP3, which is adjusted by FP controller 2 to center on (and pass) only the side frequency 11 GHz above the reference side carrier frequency. The resulting signal, carrying substantially a single frequency at the reference frequency +11 GHz, is amplified in optical amplifier EDFA4 and then input to circulator CIRC 1. The circulator passes signals in a counter-clockwise direction. More specifically, CIRC 1 passes the output from EDFA4 leftwards in a counter-clockwise rotation towards the output of optical isolator ISL 2. It is noted that the side carrier boosting scheme is also intended be used in conjunction with a dense wave division multiplexing scheme. Thus, the side carrier boosting module can simultaneously process and boost a plurality of side carriers spaced in frequency according to ITU channel spacing.

Simultaneously, the optical signal in the lower branch from splitter S4 is transmitted through isolator ISL 2 and then meets with the optical signal from the upper branch output from the circulator CIRC 1. This collision of the two optical signals traveling in opposite directions generates the SBS non-linear effect. According to one implementation, the fiber connecting isolator ISL 2 and circulator CIRC 1 can be dispersion compensating fiber which, due to its relatively smaller cross-section, promotes higher intensity and more pronounced non-linear effects such as SBS. When the optical data signal containing the reference side carrier collides with the 11 GHz side frequency signal from CIRC 1, a narrow band including the side carrier in the optical data signal is amplified relative to the data bands due to the SBS effect as explained above. This modified optical data signal then reaches the circulator CIRC 1 from which it passes in the counter-clockwise direction to optical amplifier EDFA5, which amplifies the entire spectrum of the modified optical data signal by 15-18 dB. The output from EDFA5 is the final output of the second embodiment of the side carrier boosting module 200.

Figure 8A:
FIG. 8*a* shows the spectrum of an optical carrier signal at the output of the FP4 of FIG. 5 according to an embodiment of the present invention.
Figure 8B:
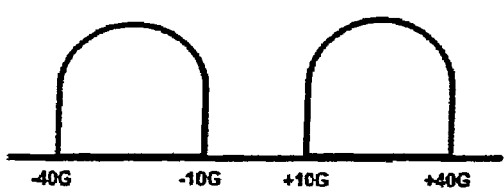
FIG. 8*b* shows the spectrum of an optical carrier signal at the output of the S7 of FIG. 5 according to an embodiment of the present invention.

Returning to FIG. 5, the optical data signal output from the side carrier boosting module 200 is input to circulator CIRC 2, which in turn transmits the signal in a counter-clockwise direction to Fabry-Perot resonator FP4, having a free spectral range (FSR) of 100 GHz and finesse on the order of 1000. The resonator FP4 is also tuned to select the side carrier at (approximately) the reference frequency (0 GHz). FIG. 8a shows a spectrum of the signal output from FP4, indicating that the data bands have again been filtered out. The data bands that are filtered out at FP4 are resent back toward circulator CIRC 2, where they are redirected in a counter-clockwise direction towards splitter S7. The spectrum of the output from splitter S7, which includes the two filtered data bands at −40 GHz to −10 GHz and +10 GHz to +40 GHz, is shown in FIG. 8b.

Figure 8C:
FIG. 8*c* shows the spectrum of an optical carrier signal at the output of the PBS3 of FIG. 5 according to an embodiment of the present invention.

It is noted that when the optical data signal is transmitted over long haul fiber between the transmitter and the receiver, the polarization state of the transmitted signal is scrambled, with the result that the received signal has an unknown time-varying polarization state. Since the time-varying polarization state varies with frequency, the side carrier is expected to have a different time-varying polarization state than either of the data bands because it is separated from the centers of data bands by 25 GHz. When the output from resonator FP4 is fed to the side carrier shifting module 210, the side carrier's orthogonal polarization states are split in polarization beam splitter PBS2, and then each of the orthogonal signals are separately modulated by 25 GHz in XMOD 2 and XMOD 3, respectively, and then joined back in PBS3. The output from PBS3 is illustrated in FIG. 8c, which shows two side carriers at −25 GHz and +25 GHz from the reference frequency, respectively. The output from PBS2 is passed on to Fabry-Perot filter FP5 (FSR=50 GHz, finesse>500) which passes both the 25 GHz left and right shifted side carriers, and transmits them to circulator CIRC 3. Circulator CIRC 3 delivers shifted SC's to reflective polarization controllers PC 1, PC 2, through respective adjacent 50 GHz-spaced channels of WDM demultiplexer DWDM 2. The polarization controllers PC 1, PC 2 are constructed to provide control of the phase of the signals reflected from the polarization controllers back to the demultiplexer DWDM 2. Such control may be used, for instance, in order to compensate for the effective fiber length between the polarization controllers PC 1, PC 2 and the demultiplexer DWDM 2. In one implementation, the polarization controllers PC 1, PC 2 include mirrors and piezoelectric actuators to adjust the distance the reflected signal travels, which in turn controls the phase of the reflected optical signal.

Each polarization controller PC 1, PC 2 is used to transform the time-varying polarization state of one of the two side carriers so that the polarization states of each side carrier matches the time varying polarization state of the respective data bands which are centered at the side carrier (−25 GHz and +25 GHz). To accomplish this, each polarization controller PC 1, PC2 obtains feedback from the photodiodes that receive the data bands. PC 1 receives the feeback via bias-T couplers BT 1 and BT 3, while PC 2 receives feedback via bias-T couplers BT 2 and BT 4. As will be described below, the demultiplexers at the top of FIG. 5, DWDM 3, DWDM 4, receive both the data bands and the side carriers, filter them into separate, adjacent frequency channels and then effectively multiply the side carrier and data bands together at photodiodes PD1, PD2, PD3 and PD4 (and other photodiodes of adjacent channels that are not shown) which respond to the intensity of the signal (i.e., the square of the amplitude). The product signal output from the photodiodes is delivered to the respective polarization controllers PC 1, PC 2 via bias-T couplers BT 1, BT 2, BT 3 and BT 4. The outputs from BT 1 and BT 3, which contain converted data signals 1 and 2, corresponding to data channels 1 and 2, are combined to provide feedback to polarization controller PC 1, and the outputs from BT 2 and BT 4, which contain data signals 3 and 4, corresponding to data channels 3 and 4, are combined to provide feedback polarization controller PC 2. It is noted that the data signals 1 and 2 are expected to have a similar polarization state since, during transmission, they occupy the same frequency range. Equally, data signals 3 and 4, corresponding to data channels 3 and 4, are expected to have a similar polarization state. At the polarization controllers PC 1, PC 2, the time-varying polarization of the combined product signals are compared to the polarization state of the individual side carrier signals.

By continually adjusting the polarization of the side carrier signal and then comparing the modified polarization state to the combined product signals, the polarization controllers PC 1, PC 2 can accurately match the time-varying polarization state of each of the side carriers with the time-varying polarization state of the corresponding data bands. This technique takes advantage of fact that it is easier to adjust the single polarization state of a single side carrier frequency than to adjust the multitude of polarization states of a band of frequencies, for example, a 20 GHz data band, via wide-band polarization compensation. However, polarization mode dispersion compensation can also be performed here by adjusting the average polarization of the data band, which is treated as having a single polarization, and then matching to the polarization of the side carrier.

Figure 8D:
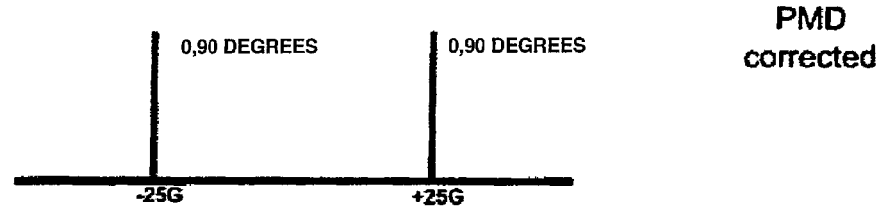
FIG. 8*d* shows the spectrum of an optical carrier signal at the output of the SS1 of FIG. 5 according to an embodiment of the present invention.
Figure 8E:
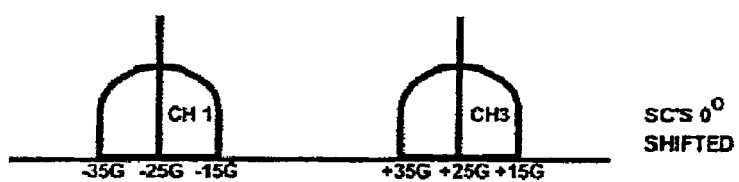
FIG. 8*e* shows the spectrum of an optical carrier signal at the output of the C5 of FIG. 5 according to an embodiment of the present invention.
Figure 8F:
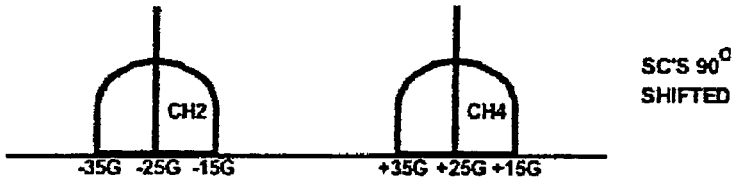
FIG. 8*f* shows the spectrum of an optical carrier signal at the output of the C6 of FIG. 5 according to an embodiment of the present invention.

Returning once again to FIG. 5, the polarization controllers PC 1, PC 2 output polarization compensated side carrier signals to circulator CIRC 3, from which they are forwarded to splitter SS1. The splitter SS1 also shifts the phase of one of the output branches by 90 degrees relative to other branch. The output spectrum from SS1 is shown in FIG. 8d. These 0 degree and 90 degree phase shifted carriers are recombined in combiners C5 and C6, respectively, with the data bands output from splitter S7. In-phase (0 degree shifted) and quadrature (90 degree-shifted) signal spectrums out of outputs of respective combiners C5 and C6 are shown in FIG. 8e and FIG. 8f. As can be discerned, in each spectrum, a side carrier is positioned in the center of a data band. Each side of the spectra is equivalent to a spectrum generated by a conventional homodyne system in which the local oscillator frequency is matched to the center frequency of the data band. Furthermore, as in conventional homodyne reception, the power of the central carrier frequency is boosted relative to the data portion in order to the improve signal-to-noise ratio of the detected signal. The side carrier that has been shifted 0 degrees can be used to detect the in-phase (I) 10 Gb/s data channels from the transmitter (channels 1, 3) and the side carrier that has been shifted 90 degrees can be used to detect the quadrature (90 degree shifted) 10 Gb/s data channels (channels 2, 4).

The combined signal from C5 is sent through optical amplifier EDFA6 and the combined signal from C6 is sent through optical amplifier EDFA7 to final 50 GHz spaced demultiplexers DWDM 3 and DWDM 4. Each of the demultiplexers DWDM 3, DWDM 4 separate the data bands and side carriers in adjacent channels for electro-optic conversion at photodiodes PD 1, PD 2 and PD 3, PD 4 respectively. In this manner 10 GB/s data channels 1 and 3 are separated in DWDM 3 and 10 Gb/s channels 2 and 4 are separated in DWDM 4, resulting in the output of four separate 10 Gb/s data signals.

In an implementation of the receiver according to the present invention, low-bandwidth photodiodes can be placed at reflective ends of polarization controllers in each leg of WDM demultiplexer to provide monitor outputs proportional to fluctuations in each of carriers, for example caused by cross phase modulation (XPM). Since the respective 10 Gb/s data channels corresponding to the side carriers generally fluctuate in sympathy, the effect of carrier fluctuation can be removed if the monitor output fluctuations are subtracted from the outputs of the respective received 10 Gb/s output channels.

Figure 9:
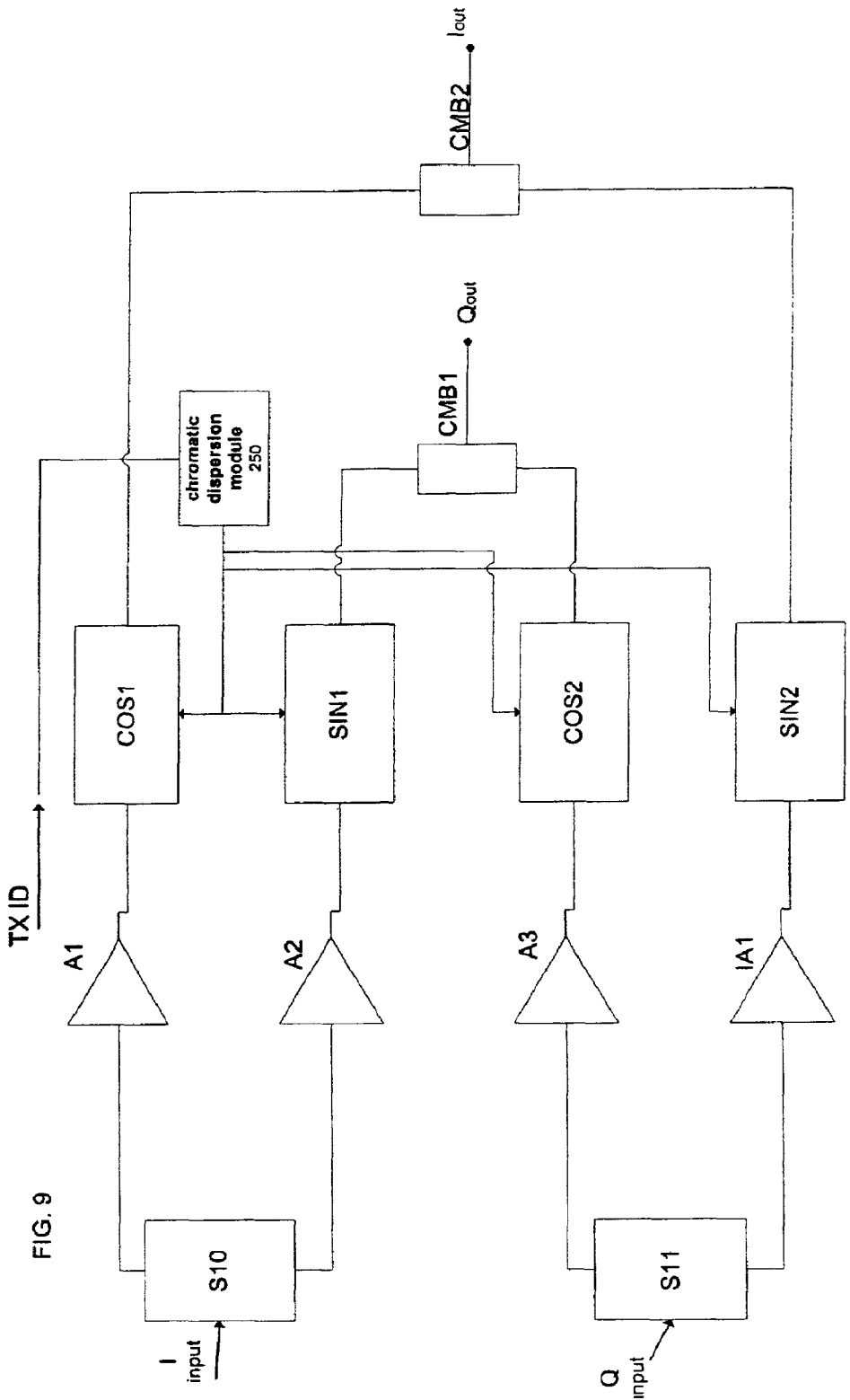
FIG. 9 is a block diagram of a chromatic dispersion compensation circuit according to an embodiment of the present invention.

After the converted data signals are further processed through trans-impedance amplifiers TIA1, TIA2, TIA 3, TIA 4 and low pass filters LPF1, LPF2, LPF3, LPF4, they are input to a chromatic dispersion compensation stage shown schematically in FIG. 9. It is noted in this context that the dispersion compensation stage can equally be implemented at the quadrature data modulators on the transmitter side instead of, or in addition to, implementation at the receiver. The effects of fiber-induced chromatic dispersion on quadrature-modulated sinusoidal data signals can be described by the following matrix equation:

$$\begin{bmatrix} I\_out(D, L, f) \\ Q\_out(D, L, f) \end{bmatrix} = \begin{bmatrix} \cos\phi 1(D, L, f) & \sin\phi 1(D, L, f) \\ -\sin\phi 1(D, L, f) & \cos\phi 1(D, L, f) \end{bmatrix} \begin{bmatrix} I\_in(f) \\ Q\_in(f) \end{bmatrix} \quad (1)$$

where I_out(f) and Q_out(f) are frequency domain representations of output I amd Q signals, which are modified from frequency domain representations of input I and Q signals, I_in(f) and Q_in(f), by the dispersion matrix, for which $$\Phi1(D, L, f) = D \cdot L \cdot \frac{0.8}{4 \cdot \pi} \cdot 10^{-26} \cdot (2\pi f)^2 \quad (2)$$

D denotes the fiber dispersion in units of ps/nm*km, L stands for fiber length in meters and f stands for frequency in Hz.

The dispersion matrix can be interpreted as a transfer function which applies a clockwise rotation angle that is proportional to the square of the frequency of the transmitted sinusoid. To counter the dispersion effect, it is feasible to apply an inverse transfer function, which can be interpreted as a counterclockwise rotation, also proportional to the square of the frequency. This counter-dispersion, or correction function may be described by the following matrix equation:

$$\text{disp\_corr}(D, L, F) = \begin{bmatrix} \cos(\phi1(D, L, f)) & -\sin(\phi1(D, L, f)) \\ \sin(\phi1(D, L, f)) & \cos(\phi1(D, L, f)) \end{bmatrix} \quad (3)$$

Therefore to correct the I and Q data signal for the effects of chromatic dispersion, the correction function is applied to the I and Q input signals (again, either at the transmitter or at the receiver, as is shown). Multiplying the correction function by the input signals yields:

$$I\_out = \cos\phi1(D, L, f) \cdot I\_in - \sin\phi1(D, L, f) \cdot Q\_in$$

$$Q\_out = \sin\phi1(D, L, f) \cdot I\_in + \cos\phi1(D, L, f) \cdot Q\_in \quad (4)$$

From equation (4), it is clear that dispersion compensation can be obtained by modifying the input I and Q data signals with an appropriate transfer function and then combining the modified signal. An embodiment of a dispersion correction circuit that performs these operations is shown in FIG. 9. As shown, the I input signal is input to a splitter S10, from which an upper branch is delivered to amplifier A1 and a lower branch is delivered to an amplifier A2 in order to boost the signal. The upper branch is transmitted to a COS1 circuit which applies the cosine portion of the dispersion correction function $\cos\phi1$ (D,L,f) to the input data signal as will be described further below. The lower branch from the splitter S10 is fed to a SIN1 circuit which applies the complementary sine portion of the dispersion correction function.

The Q data signal is concurrently input to splitter S11 and broken up into an upper branch which is fed through amplifiers A3, and a lower branch which is delivered to inverting amplifier IA1 which, in addition to boosting the signal, also shifts the phase of the signal by 180 degrees. The upper and lower branches are thereafter input to respective COS2 and SIN2 circuits which perform the same functions as the COS1 and SIN1 circuits, respectively. As shown, the modified signal from the SIN1 circuit, which is the product I_in times $\sin\phi1$ (D,L,f), is combined with the output from COS2, the product, Q_in times $\cos\phi1$ (D,L,f), at combiner CMB 1. Comparison with equation (4), shows that the output of combiner CMB1 matches the desired Q_out output for dispersion compensation. Similarly, the combination at CMB2, containing the products I_in times $\cos\phi1$ (D,L,f) and Q_in times $-\sin\phi1$ (D,L,f), matches the desired I_out output for dispersion compensation.

Furthermore, the TX ID pilot signal, which, as noted above, is modulated onto the reference frequency +/−10-100 kHz, is received at the polarization controlllers PC 1, PC 2 and converted to the RF domain at photodetectors PD3 and PD4.

The TX pilots may be coded by frequency modulation or by another code modulation technique. The TX ID identifies the particular transmitter sending the signal, allowing information, such as the length of optical fiber between the transmitter and the receiver (which is the same as the parameter, L, used in the dispersion correction function), to be extracted from the coded signal. This information is transmitted to the chromatic dispersion compensation stage where it is received by a chromatic dispersion module 250. The chromatic dispersion module, in turn, is coupled to the SIN and COS circuits and causes adjustments to be made to the respective transfer functions applied to the I and Q inputs in accordance with the information extracted from the TX ID.

Figure 10A:
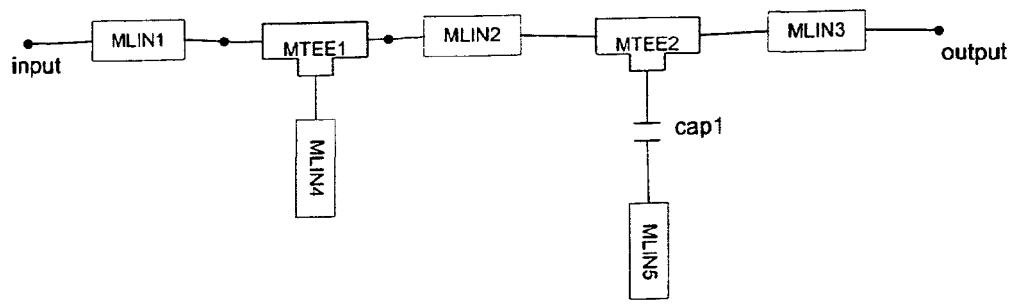
FIG. 10*a* is a block diagram of a microstrip implementation of a circuit that applies a COS transfer function to an input signal according to an embodiment of the present invention.
Figure 10B:
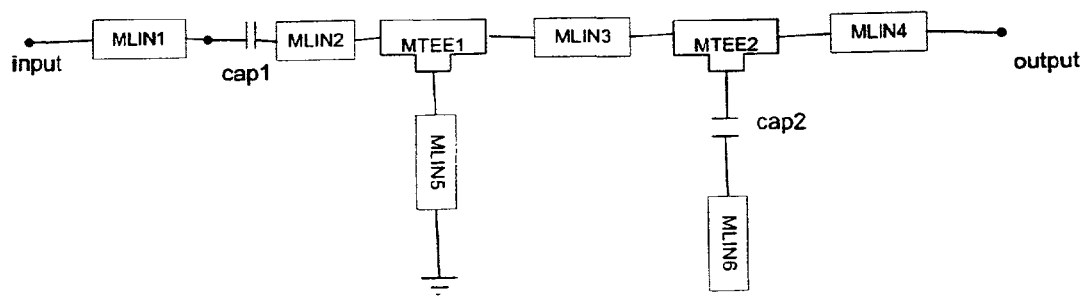
FIG. 10*b* is a block diagram of a microstrip implementation of a circuit that applies a SIN transfer function to an input signal according to an embodiment of the present invention.

According to an embodiment of the present invention, the SIN and COS circuits of FIG. 9 are implemented as microstrip circuits which use layers or regions of copper deposited on a circuitboard having various widths and lengths, to adjust electromagnetic effects that modify signals sent through the copper layers or regions. FIG. 10a and FIG. 10b illustrate implementations of the sin $\phi1$ (D,L,f) and cos $\phi1$ (D,L,f) transfer functions respectively. As is known in the art, various combinations of linear strips, (denoted as MLIN), t-junctions (denoted as MTEE), and capacitive elements (cap1, cap2), again having various adjustable lengths and widths are used to fine-tune the electromagnetic wave effects in the copper regions to simulate the desired transfer functions.

In the foregoing description, the method and system of the invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. For example, although only a 10 Gbp/s digital baseband is discussed, the inventive principles herein may be applied to higher or lower data rates as the case may be.

What is claimed is:

1. An optical data signal transmitter comprising:
   a Mach-Zender modulator, the Mach-Zender modulator receiving an input optical signal and modulating a pair of side carriers onto the input optical signal, outputting an optical carrier signal; and
   at least two phase modulators, the at least two phase modulators receiving the optical carrier signal and each generating an optical data signal by modulating a pair of data signals onto at least two data bands;
   wherein the data bands are spread in frequency when modulated onto the optical carrier signal, the spreading causing an amplitude of the optical data signal to be reduced to zero during transitions between data symbols.

2. The transmitter of claim 1, further comprising:
   a second Mach-Zender modulator, the second Mach-Zender modulator imprinting the input optical signal with an identification code to generate a TX ID, the identification code including information concerning the transmitter; and
   a combiner, the combiner attaching the TX ID to the optical data signal.

3. The transmitter of claim 2, further comprising:
   a polarization transformer;
   wherein the at least two phase modulators generate a first optical data signal including data bands imprinted with a first pair of data channels, the first optical data signal having a first polarization state, and a second optical data signal including data bands imprinted with a second pair of data channels, the second optical data signal having a first polarization state, the polarization transformer altering a polarization state of the first optical data signal from the first polarization state to a second polarization state.

4. The transmitter of claim 3, further comprising
a dense wave division multiplexing unit; and
means for separating the first pair of data channels from the second pair of data channels based upon differing polarization states of the first and second optical data signals;
wherein the first and second pairs of data channels are input to separate channels of the dense wave division multiplexing unit.

5. The transmitter of claim 1, wherein the pair of side carriers is modulated onto the input optical signal at both above and below a reference frequency of the input optical signal.

6. The transmitter of claim 5, wherein a first side carrier of the pair of side carriers is modulated onto the input optical signal at 30 Ghz above and below the reference frequency, and a second side carrier of the pair of side carriers is modulated onto the input optical signal at 20 Ghz above and below the reference frequency.

7. An apparatus for compensating a quadrature modulated optical data signal for effects of chromatic dispersion occurring during transmission over optical fiber, comprising:
a receiver configured to separate in-phase and quadrature components of the optical data signal;
a converter configured to optoelectrically convert the in-phase and quadrature components of the optical data signal into in-phase and quadrature data signals;
a modifier configured to apply a corrective function to the in-phase and quadrature data signals, the corrective function modifying the in-phase and quadrature data signals in a manner that counteracts effects of chromatic dispersion on the in-phase and quadrature components of the optical data signal.

8. The apparatus of claim 7, wherein the corrective function is a function of a coefficient of fiber dispersion, a length of the optical fiber, and frequency of the optical data signal.

9. An apparatus for correcting a quadrature modulated optical data signal for effects of chromatic dispersion, comprising:
a receiver configured to derive in-phase and quadrature data signals via a homodyne reception system; and
a modifier configured to apply a corrective function to the in-phase and quadrature data signals, the corrective function modifying the in-phase and quadrature data signals in a manner that counteracts effects of chromatic dispersion on the in-phase and quadrature components of the optical data signal.

10. An apparatus for reducing the transmitted power of a quadrature modulated optical data signal, comprising:
a transmitter configured to provide a quadrature modulated optical data signal,
the transmitter further configured to, during all transitional states of the quadrature modulated optical data signal in which data symbols can change in value, reduce the power to zero such that transmitted power decreases to zero at approximately a mid point of each of the transitional states, where data signals are spread out by approximately fifty percent in the frequency domain equivalent to a multiplication by a sine wave at half the data rate such that each symbol returns to zero at approximately a mid-point of the transitional states.

11. An apparatus for reducing the transmitted power of a quadrature modulated optical data signal, comprising:
a transmitter configured to provide a quadrature modulated optical data,
the transmitter further configured to, during all transitional states of the quadrature modulated optical data signal in which data symbols can change in value, reduce the power to zero such that transmitted power decreases to zero at approximately a mid point of each of the transitional states,
the transmitter further configured to combine the quadrature modulated optical data signal with a side carrier, and
the transmitter further configured to transmit the side carrier with the quadrature modulated optical data signal.

12. The apparatus of claim 11, wherein the transmitted power is independent of a data pattern of the quadrature modulate optical data signal.

13. A method of reducing the transmitted power of a quadrature modulated optical data signal, comprises the steps of:
providing a quadrature modulated optical data signal by a transmitter;
during all transitional states of the quadrature modulated optical data signal in which data symbols can change in value, reducing, by the transmitter, the power to zero such that transmitted power decreases to zero at approximately a mid point of each of the transitional states; and
combining the quadrature modulated optical data signal with a side carrier and transmitting the side carrier with the quadrature modulated optical data signal.

14. The method of claim 13, wherein the transmitted power is independent of a data pattern of the quadrature modulate optical data signal.

* * * * *